US012251941B2

(12) United States Patent
Yasuda et al.

(10) Patent No.: US 12,251,941 B2
(45) Date of Patent: Mar. 18, 2025

(54) INK CIRCULATION SYSTEM AND INKJET PRINTING APPARATUS

(71) Applicant: SCREEN HOLDINGS CO., LTD., Kyoto (JP)

(72) Inventors: Tomonori Yasuda, Kyoto (JP); Takanori Tsuji, Kyoto (JP); Akira Murata, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 153 days.

(21) Appl. No.: 18/018,431

(22) PCT Filed: Aug. 20, 2021

(86) PCT No.: PCT/JP2021/030581
§ 371 (c)(1),
(2) Date: Jan. 27, 2023

(87) PCT Pub. No.: WO2022/064919
PCT Pub. Date: Mar. 31, 2022

(65) Prior Publication Data
US 2023/0302813 A1 Sep. 28, 2023

(30) Foreign Application Priority Data
Sep. 23, 2020 (JP) ................................ 2020-159017

(51) Int. Cl.
*B41J 2/18* (2006.01)

(52) U.S. Cl.
CPC ...................................... *B41J 2/18* (2013.01)

(58) Field of Classification Search
CPC ........................................................ B41J 2/18
See application file for complete search history.

(56) References Cited

U.S. PATENT DOCUMENTS

2012/0026242 A1 2/2012 Igarashi
2016/0207317 A1 7/2016 Miravet Jimenez et al.
2020/0147977 A1* 5/2020 Mori ........................ B41J 2/18

FOREIGN PATENT DOCUMENTS

JP 2008-023806 A 2/2008
JP 2011140197 A * 7/2011
(Continued)

OTHER PUBLICATIONS

Yonehara, MachineTranslationofJP-2019014194-A, 2019 (Year: 2019).*
(Continued)

*Primary Examiner* — Scott A Richmond
(74) *Attorney, Agent, or Firm* — Rimon P.C.

(57) ABSTRACT

A technique for making the amount of ink to be calculated appropriate in accordance with the amount of ink to be ejected from heads is provided. An inkjet printing apparatus includes a supply tank, a return tank, a first connecting pipe, a second connecting pipe, a head, a pressure-difference producer, an ejection-amount predictor, and a pressure controller. The first connecting pipe transfers ink in the supply tank to the return tank. The second connecting pipe returns ink in the return tank to the supply tank. The head is interposed in the first connecting pipe. The pressure-difference producer sends ink from the supply tank to the return tank through the first connecting pipe. The ejection-amount predictor predicts the amount of ink to be ejected at a time to come after the present time from the head. The pressure controller controls the amount of ink to be supplied from the supply tank to the head, by controlling the pressure-difference producer in accordance with the predicted amount of ink to be ejected.

10 Claims, 6 Drawing Sheets

(56) References Cited

FOREIGN PATENT DOCUMENTS

| | | | | |
|---|---|---|---|---|
| JP | 2012-030494 | A | | 2/2012 |
| JP | 2013-71247 | A | | 4/2013 |
| JP | 2019014194 | A | * | 1/2019 |

OTHER PUBLICATIONS

Shiotani, Machine TranslationofJP-2011140197-A, 2011 (Year: 2011).*

International Search Report issued in corresponding International Patent Application No. PCT/JP2021/030581, dated Oct. 19, 2021, with English translation.

Office Action dated on Apr. 30, 2024 issued in the corresponding Japanese Patent Application No. 2020-159017, w/ English Translation.

* cited by examiner

INK CIRCULATION SYSTEM AND INKJET PRINTING APPARATUS

CROSS REFERENCE TO RELATED APPLICATIONS

This application is the U.S. National Phase under 35 U.S.C. § 371 of International Patent Application No. PCT/JP2021/030581, filed on Aug. 20, 2021, which claims the benefits of Japanese Patent Application No. 2020-159017, filed on Sep. 23, 2020 the entire contents of which are hereby incorporated by reference.

TECHNICAL FIELD

The present invention relates to an ink circulation system and an inkjet printing apparatus.

BACKGROUND ART

Inkjet printing apparatuses that interpose ink ejection heads in a circulation path for circulating ink are known among inkjet printing apparatuses that perform printing by an inkjet method (e.g., Patent Literature (PTL) 1). Connecting the heads to the ink circulation path reduces the possibility that the heads will be run out of ink.

CITATION LIST

Patent Literature

[PTL 1] Japanese Patent Application Laid-Open No. 2008-23806

SUMMARY OF INVENTION

Technical Problem

However, the amount of ink to be ejected may vary due to the gradation of an image to be printed, during printing of the image. For example, an increase in the amount of ink to be ejected may cause the intrusion of air into the heads because a sufficient flow rate cannot be ensured on the outlet side of the heads. The intrusion of air into the heads may cause an ejection failure of ink from the nozzles (failing nozzles). To avoid the occurrence of such failing nozzles, it is conceivable to set the amount of ink to be circulated so as to match the amount of ink to be circuited in a condition in which the amount of ink to be ejected is large. In this case, however, the amount of ink to be circulated becomes excessively large in a condition in which the amount of ink to be ejected is small, and accordingly this may cause undesirable results such as advancing ink degradation, creating instability in the meniscus of ink in the nozzles, or shortening lifetimes of circulation pumps. There is thus demand for a technique to set a proper amount of ink to be circulated in accordance with the amount of ink to be ejected.

It is an object of the present invention to provide a technique that allows appropriate control of the amount of ink to be circulated in accordance with the amount of ink to be ejected from heads.

Solution to Problem

To solve the problem described above, a first aspect is an ink circulation system that includes a supply tank, a return tank, a first connecting pipe that connects the supply tank and the return tank and that transfers ink stored in the supply tank to the return tank, a second connecting pipe that connects the return tank and the supply tank and that returns ink stored in the return tank to the supply tank, a head that is interposed in the first connecting pipe and capable of ejecting ink, a pressure-difference producer that produces a pressure difference between the supply tank and the return tank to send ink from the supply tank to the return tank through the first connecting pipe, an ejection-amount predictor that predicts an amount of ink to be ejected at a time to come after a present time from the head, and a pressure controller that controls an amount of ink to be supplied from the supply tank to the head by controlling the pressure-difference producer in accordance with a predicted amount of ink to be ejected, predicted by the ejection-amount predictor.

A second aspect is the ink circulation system according to the first aspect, in which the ejection-amount predictor predicts the amount of ink to be ejected, in accordance with image data that indicates an image to be formed on a base material by the head.

A third aspect is the ink circulation system according to the second aspect, in which the pressure controller calculates a printing ratio from the image data and controls the pressure-difference producer in accordance with the printing ratio calculated.

A fourth aspect is the ink circulation system according to any one of the first to third aspects, in which the pressure controller controls the pressure-difference producer in accordance with the predicted amount of ink to be ejected, timing when the amount of ink to be ejected becomes the predicted amount of ink to be ejected, and a time lag that depends on the pressure-difference producer and the first connecting pipe.

A fifth aspect is the ink circulation system according to any one of the first to fourth aspects, in which the pressure controller is capable of executing determination processing for determining whether a predicted increasing rate exceeds a critical increasing rate of supply, the predicted increasing rate being an increment in the predicted amount of ink to be ejected per unit time, first control processing for, when it is determined in the determination processing that the predicted increasing rate does not exceed the critical increasing rate of supply, controlling the pressure-difference producer in accordance with the predicted amount of ink to be ejected and a first time lag that depends on the pressure-difference producer and the first connecting pipe, and second control processing for, when it is determined in the determination processing that the predicted increasing rate exceeds the critical increasing rate of supply, controlling the pressure-difference producer in accordance with the predicted amount of ink to be ejected, timing when the amount of ink to be ejected becomes the predicted amount of ink to be ejected, and a second time lag that is longer than the first time lag.

A sixth aspect is the ink circulation system according to the fifth aspect, in which the first control processing includes processing for controlling the pressure-difference producer such that an increasing rate of supply becomes a value that depends on the predicted increasing rate, the increasing rate of supply being an increment in the amount of supply per unit time.

A seventh aspect is the ink circulation system according to the fifth or sixth aspect, in which the second control processing includes processing for controlling the pressure-difference producer such that an increasing rate of supply becomes a value that depends on the critical increasing rate of supply, the increasing rate of supply being an increment in the amount of supply per unit time.

An eighth aspect is the ink circulation system according to any one of the first to seventh aspects, in which the pressure-difference producer produces the pressure difference in a condition in which the supply tank and the return tank are both kept under a negative pressure.

A ninth aspect is the ink circulation system according to any one of the first to eighth aspects, in which the pressure-difference producer produces the pressure difference in a condition in which the supply tank is kept under a positive pressure and the return tank is kept under a negative pressure.

A tenth aspect is an inkjet printing apparatus that includes a transporter that transports a base material in a transport direction, and the ink circulation system according to any one of the first to ninth aspects.

Advantageous Effects of Invention

According to the ink circulation system of the first to ninth aspects, the amount of ink to be ejected is predicted, and the amount of ink to be supplied is controlled in accordance with the predicted amount of ink to be ejected. This allows appropriate control of the amount of ink to be circulated.

According to the ink circulation system of the second aspect, the amount of ink to be ejected is predicted with accuracy in accordance with the image data. This allows appropriate control of the amount of ink to be supplied and appropriate control of the amount of ink to be circulated.

According to the ink circulation system of the third aspect, the amount of ink to be ejected is predicted with accuracy by calculating the printing ratio. This allows appropriate control of the amount of ink to be supplied and accordingly appropriate control of the amount of ink to be circulated.

According to the ink circulation system of the fourth aspect, the pressure-difference producer is controlled in consideration of the time lags. This reduces the occurrence of a delay in increase and decrease of the amount of ink to be supplied, relative to increase and decrease of the amount of ink to be ejected.

According to the ink circulation system of the fifth aspect, if the predicted increasing rate does not exceed the critical increasing rate of supply, the pressure-difference producer is controlled based on the predicted amount of ink to be ejected and the first time lag. This allows the amount of ink to be supplied to increase based on the timing when the amount of ink to be ejected becomes the predicted amount of ink to be ejected. If the predicted increasing rate exceeds the critical increasing rate of supply, the pressure-difference producer is controlled based on the predicted amount of ink to be ejected and the second time lag that is longer than the first time lag. Accordingly, even if the predicted increasing rate exceeds the critical increasing rate of supply, it is possible to increase the amount of ink to be supplied in time for the time when the amount of ink to be ejected becomes the predicted amount of ink to be ejected.

According to the ink circulation system of the sixth aspect, the pressure-difference producer is controlled such that the increasing rate of supply becomes a value that depends on the predicted increasing rate. Accordingly, it is possible to increase the amount of ink to be supplied in time for the time when the amount of ink to be ejected becomes the predicted amount of ink to be ejected.

According to the ink circulation system of the seventh aspect, the pressure-difference producer is controlled in accordance with the second time lag such that the increasing rate of supply becomes a value that depends on the critical increasing rate of supply. This allows the amount of ink to be supplied to increase in accordance with the time when the amount of ink to be ejected becomes the predicted amount of ink to be ejected

DESCRIPTION OF EMBODIMENT

Hereinafter, an embodiment of the present invention will be described with reference to the accompanying drawings. Note that constituent elements described in the embodiment are merely examples, and the scope of the present invention is not intended to be limited thereto. To facilitate understanding of the drawings, the dimensions or number of each constituent element may be illustrated in an exaggerated or simplified form as necessary.

1. Embodiment

Figure 1:
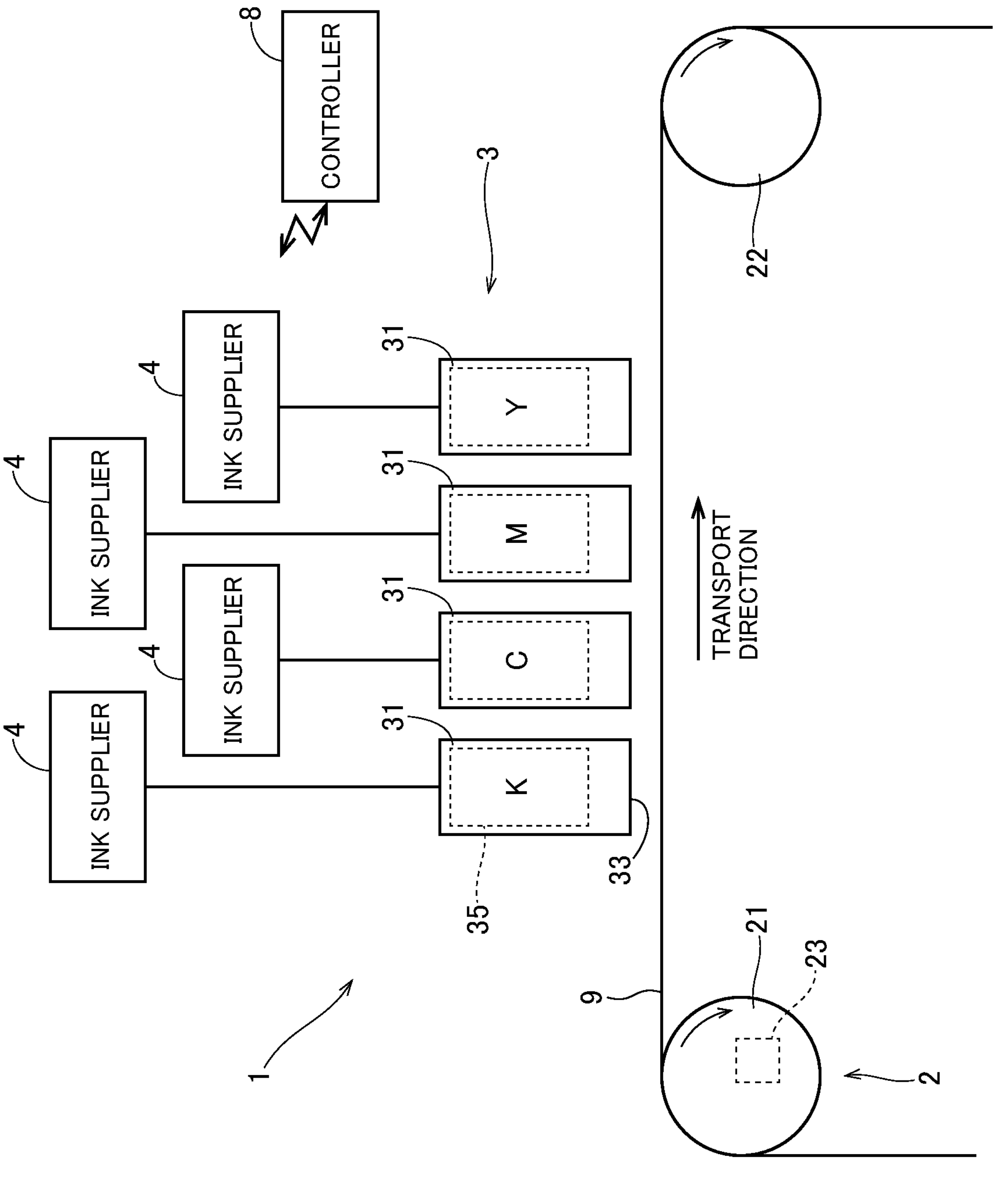
FIG. 1 is an illustration of an inkjet printing apparatus according to an embodiment.

FIG. 1 is an illustration of an inkjet printing apparatus 1 according to an embodiment. The inkjet printing apparatus 1 is an apparatus that forms an image on the surface of a base material 9 that is transported in a predetermined transport direction by an inkjet method. As illustrated in FIG. 1, the inkjet printing apparatus 1 includes a transporter 2, a printer 3, and a controller 8.

The transporter 2 transports a long band-like base material 9 in a predetermined transport direction. The base material 9 may be paper or film. The transporter 2 transports the base material 9 by a roll-to-roll method. The transporter 2 includes a first transport roller 21, a second transport roller 22, and an encoder 23. The second transport roller 22 is located apart from and downstream of the first transport roller 21 in the transport direction. The encoder 23 may be mounted on, for example, the first transport roller 21. The encoder 23 detects the amount of rotation of the first transport roller 21. Specifically, the encoder 23 outputs a pulse signal to the controller 8 each time the first transport roller 21 rotates a predetermined angle. The controller 8 described later determines the timing when each head 31 ejects ink, in accordance with the pulse signal. Note that the encoder 23 may detect the amount of rotation of a transport roller that is different from the first transport roller 21, such as the second transport roller 22.

The printer 3 includes a plurality of heads 31 and a plurality of ink suppliers 4. The heads 31 are arranged at predetermined intervals in the transport direction. For example, the heads 31 each may eject different color ink (e.g., cyan (C), magenta (M), yellow (Y), and black (K)).

Each head 31 has an ejection surface 33 that faces the surface of the base material 9 transported by the transporter 2. The ejection surface 33 has a plurality of nozzles arranged in the width direction. Each nozzle may be connected to, for example, a piezo or thermal inkjet element. The inkjet element causes the nozzle to eject ink under the control of the controller 8.

Each head 31 also has an ink room 35 in order to temporarily store ink. The ink room 35 communicates with the plurality of nozzles. The ink stored in the ink room 35 is ejected from each nozzle by the power of each inkjet element. The ink supplier 4 supplies the ink to the ink room 35 of the head 31.

Figure 2:
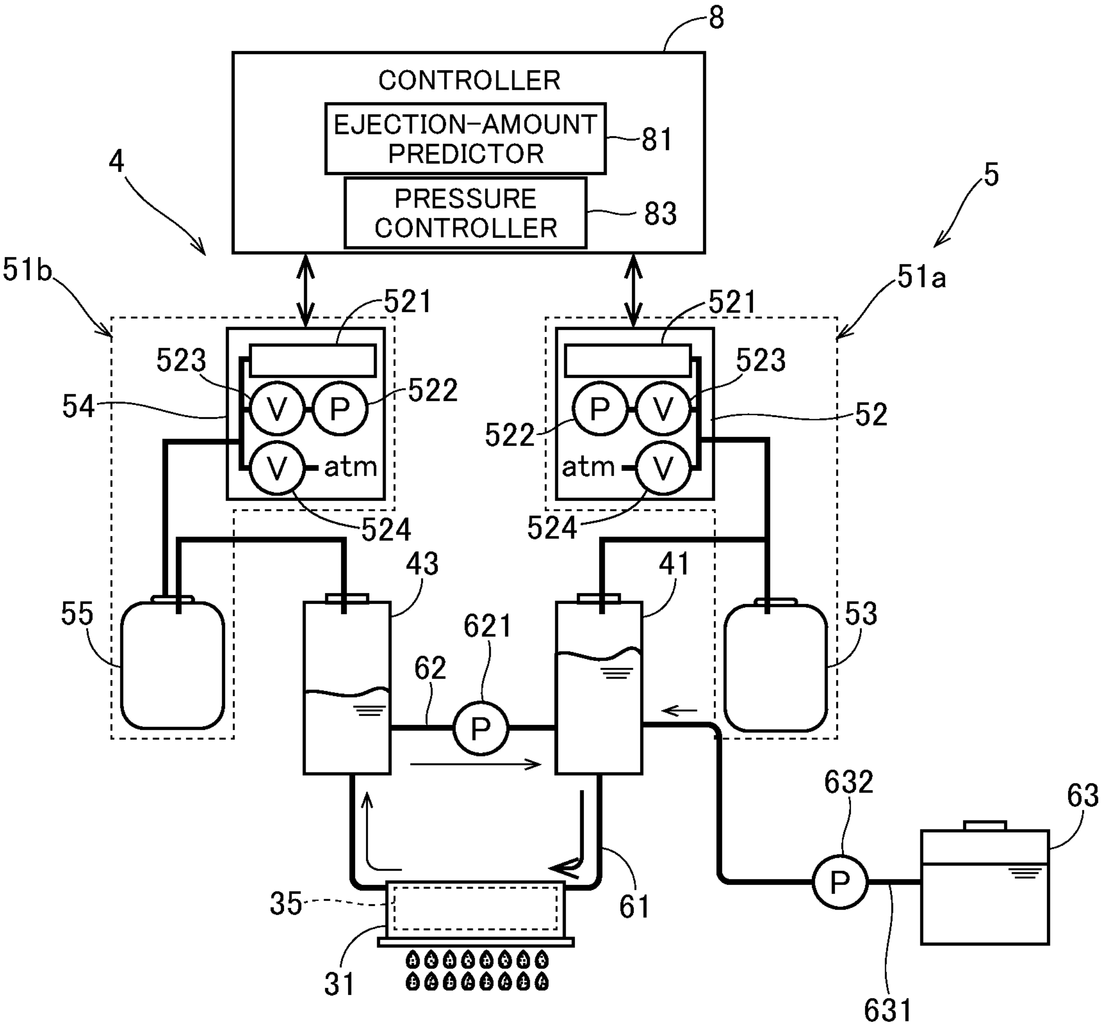
FIG. 2 is an illustration of a configuration of one ink supplier.

FIG. 2 is an illustration of a configuration of one ink supplier 4. As illustrated in FIG. 2, the ink supplier 4 configures an ink circulation system for circulating ink, together with the head 31. Specifically, as illustrated in FIG. 2, the ink supplier 4 includes a supply tank 41, a return tank 43, a pressure-difference producer 5, a first connecting pipe 61, a second connecting pipe 62, and a replenishing tank 63.

The supply tank 41 and the return tank 43 are each capable of storing ink. The first connecting pipe 61 connects the supply tank 41 and the return tank 43. The head 31 is interposed in the first connecting pipe 61. That is, the head 31 is located between the supply tank 41 and the return tank 43 in the first connecting pipe 61. The first connecting pipe 61 includes piping that connects the supply tank 41 and the ink room 35, and piping that connects the ink room 35 and the return tank 43.

The ink stored in the supply tank 41 is transferable from the supply tank 41 to the ink room 35 of the head 31 through the first connecting pipe 61. The ink stored in the ink room 35 is also transferable to the return tank 43 through the first connecting pipe 61.

The second connecting pipe 62 serves as a bypass that connects the return tank 43 and the supply tank 41. The ink stored in the return tank 43 is transferable to the supply tank 41 through the second connecting pipe 62. The second connecting pipe 62 is provided with a return pump 621. The return pump 621 produces a pressure for supplying ink from the return tank 43 to the supply tank 41 within the second connecting pipe 62. Note that a gravity may be used to transfer the ink from the return tank 43 to the supply tank 41.

The replenishing tank 63 stores ink. The replenishing tank 63 is connected to the supply tank 41 via a supply pipe 631. The supply pipe 631 has a solution sending pump 632 interposed therein. The solution sending pump 632 generates pressure in the supply pipe 631 to send the ink stored in the replenishing tank 63 to the supply tank 41. For example, in the case where a total amount of circulating ink has decreased due to, for example, printing, the ink is supplied from the replenishing tank 63 to the supply tank 41 by the solution sending pump 632.

The pressure-difference producer 5 produces a difference in pressure between the supply tank 41 and the return tank 43 by adjusting the pressure in the supply tank 41 and the pressure in the return tank 43. Hereinafter, the difference in pressure produced by the pressure-difference producer 5 is simply referred to as the "pressure difference." The pressure-difference producer 5 sends the ink from the supply tank 41 toward the return tank 43 by creating the pressure difference.

The pressure-difference producer 5 includes a first pressure regulator 51*a* and a second pressure regulator 51*b*. The first pressure regulator 51*a* adjusts pressure in the supply tank 41. The second pressure regulator 51*b* adjusts pressure in the return tank 43.

The first pressure regulator 51*a* includes a first pressure changer 52 and a pressure tank 53. The first pressure regulator 51*a* is connected to the supply tank 41 and adjusts the pressure in the supply tank 41. The first pressure changer 52 changes the pressure in the pressure tank 53 on the basis of a control signal output from the controller 8. Specifically, the first pressure changer 52 includes a pneumatic sensor 521, a pressure pump 522, a pressure reducing pump 523, and a suction pump 524.

The pneumatic sensor 521 measures the pressure in piping that communicates with the inside of the pressure tank 53. The pneumatic sensor 521 outputs a measurement signal that indicates the measured pressure, to the controller 8.

The pressure pump 522 and the pressure reducing pump 523 are provided in the piping connected to the inside of the pressure tank 53. The pressure pump 522 sends air to the pressure tank 53 so as to increase the pressure in the pressure tank 53. The pressure reducing pump 523 suctions the air in the pressure tank 53 so as to reduce the pressure in the pressure tank 53.

The suction pump 524 has one end connected to the pressure tank 53 and the other end provided midway in piping that is open to the atmosphere. The suction pump 524 generates pressure in the piping so as to discharge the air in the pressure tank 53 to the atmosphere.

The pressure tank 53 communicates with the supply tank 41. The pressure in the supply tank 41 is changed by changing the pressure in the pressure tank 53.

The second pressure regulator 51*b* includes a second pressure changer 54 and a negative pressure tank 55. The second pressure regulator 51*b* is connected to the negative pressure tank 55 to adjust the pressure in the negative pressure tank 55. The second pressure changer 54 changes the pressure in the negative pressure tank 55 in accordance with the control signal that is output from the controller 8. The second pressure changer 54 has the same configuration as the first pressure changer 52, and therefore a description thereof shall be omitted. The negative pressure tank 55 communicates with the return tank 43. The pressure in the return tank 43 is changed by changing the pressure in the negative pressure tank 55.

The pressure-difference producer 5 may produce a pressure difference in a condition in which the insides of the supply tank 41 and the return tank 43 are both kept under negative pressures. The pressure-difference producer 5 may also produce a pressure difference in a condition in which the inside of the supply tank 41 is kept under a positive pressure and the inside of the return tank 43 is kept under a negative pressure.

The controller 8 has a configuration serving as a computer that may include, for example, a processor such as a CPU, a ROM for storing programs, and a RAM for storing various types of information. The controller 8 causes each head 31 to eject ink in accordance with the image data and the pulse signal that is output from the encoder 23. Accordingly, an image represented by the image data is formed on the surface of the base material 9.

As illustrated in FIG. 2, the controller 8 includes an ejection-amount predictor 81 and a pressure controller 83. The ejection-amount predictor 81 and the pressure controller 83 are functions realized by the processor of the controller 8 operating in accordance with programs.

The ejection-amount predictor 81 predicts the amount of ink to be ejected per unit time at a time to come after the present time from the head 31 on the basis of the image data. For example, the ejection-amount predictor 81 may calculate a printing ratio from the image data. The printing ratio indicates the amount of ink to be applied per unit area of the base material 9. The ejection-amount predictor 81 calculates, on the basis of the printing ratio, a predicted amount of ink to be ejected that is a predicted value for the amount of ink to be ejected. Note that the ejection-amount predictor 81 may use the predicted amount of ink to be ejected as the printing ratio.

The pressure controller 83 controls the pressure-difference producer 5 in accordance with the predicted amount of ink to be ejected, predicted by the ejection-amount predictor 81, so as to control the amount of ink to be supplied from the supply tank 41 to the return tank 43.

For example, the pressure controller 83 may perform feedforward control. More specifically, as will be described, the pressure controller 83 controls the pressure-difference producer 5 on the basis of the predicted amount of ink to be ejected and time lags (a first time lag T1 and a second time lag T2 described later). As a result of the pressure controller 83 controlling the pressure-difference producer 5, the pressure difference is adjusted based on the timing that depends on fluctuations in the predicted amount of ink to be ejected. The time lag is a difference (time difference) from the time when the pressure controller 83 outputs a control signal for changing the pressure difference to the first pressure regulator 51*a* or the second pressure regulator 51*b*, to the time when the pressure difference is actually changed. For example, the magnitude of the time lag may be appropriately determined in accordance with the pressure-difference producer 5 and the first connecting pipe 61. More specifically, the magnitude of the time lag may be appropriately determined in accordance with, for example, the characteristics of the pressure pump 522 and the pressure reducing pump 523 of the first pressure regulator 51*a* or the second pressure regulator 51*b*, the size and shape of the pressure tank 53, or the length or sectional size of the first connecting pipe 61. Alternatively, the magnitude of the time lag may also be determined in accordance with the viscosity or temperature of the ink.

Figure 3:
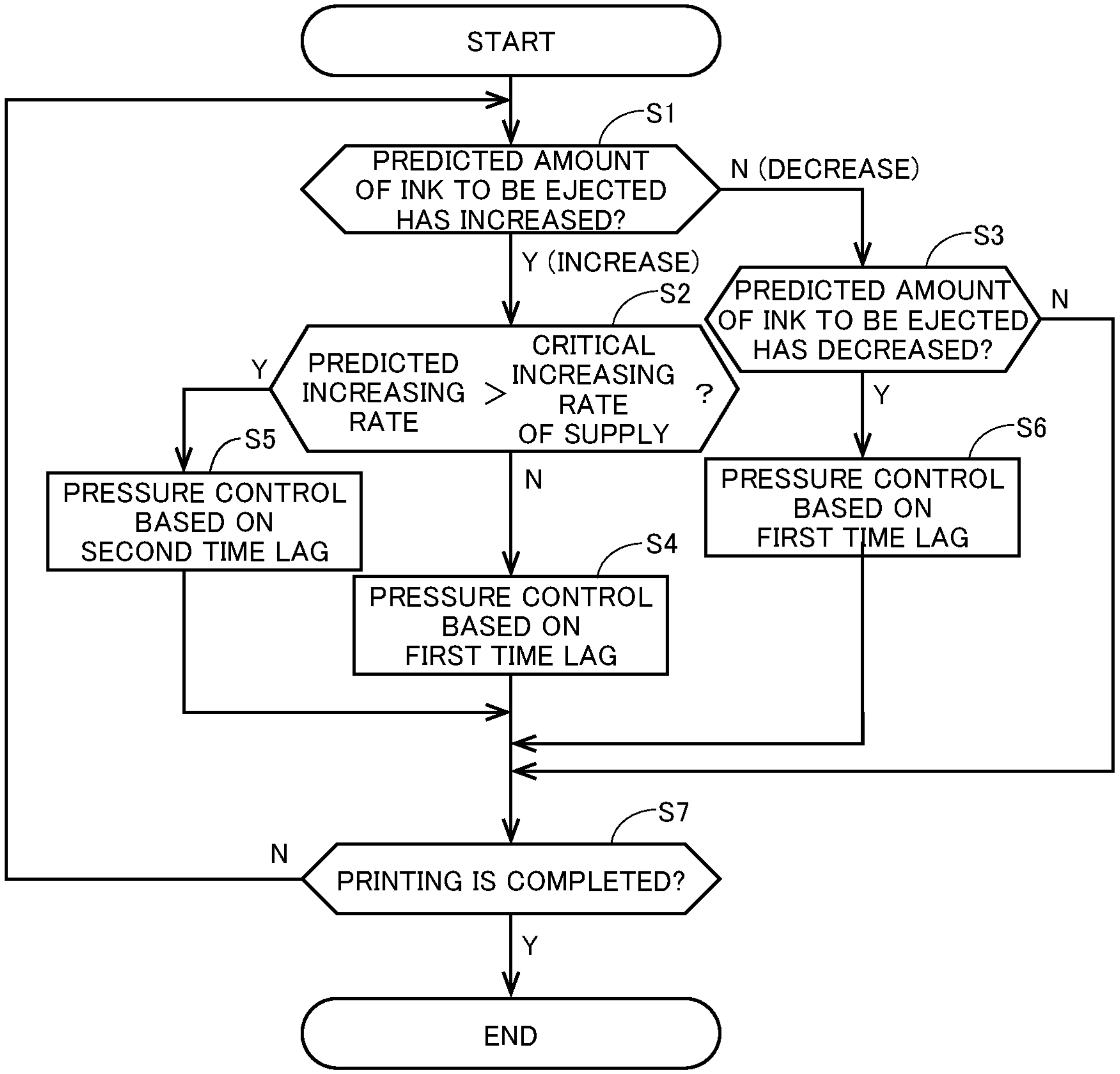
FIG. 3 is a diagram showing an example of a procedure of controlling a pressure controller.

FIG. 3 is a diagram showing an example of control of the pressure controller 83. When print processing has started, the ejection-amount predictor 81 acquires, with predetermined timing, the predicted amount of ink to be ejected at a time to come after the present time as appropriate. The pressure controller 83 executes the procedure of control illustrated in FIG. 3 while monitoring the predicted amount of ink to be ejected, acquired by the ejection-amount predictor 81.

The pressure controller 83 first determines whether the predicted amount of ink to be ejected, acquired by the ejection-amount predictor 81 is greater than the amount of ink to be ejected at the present time (increment determination processing S1). If it is determined in the increment determination processing S1 that the predicted amount of ink to be ejected increases (in the case of YES), the pressure controller 83 executes increasing-rate determination processing S2 described later. If it is determined in the increment determination processing S1 that the predicted amount of ink to be ejected does not increase (in the case of NO), the pressure controller 83 determines whether the predicted amount of ink to be ejected at a time to come after the present time is less than the amount of ink ejected at the present time (decrement determination processing S3).

The increasing-rate determination processing S2 is processing in which the pressure controller 83 determines whether the predicted increasing rate exceeds a critical increasing rate of supply (increasing-rate determination processing S2). Note that the predicted increasing rate is the rate at which the predicted amount of ink to be ejected increases (the increment per unit time). The critical increasing rate of supply is a maximum value of the increasing rate of supply, and the increasing rate of supply is the increasing rate of the amount of ink to be supplied from the supply tank 41 to the head 31 by the pressure-difference producer 5 (the increment per unit time). The increasing rate of supply is a value corresponding to the increasing rate of pressure difference produced by the pressure-difference producer 5. The relationship between the increasing rate of supply and the increasing rate of pressure difference may be determined in advance based on a test. For example, the critical increasing rate of supply may be determined based on requisites such as the characteristics of the pressure-difference producer 5, the size of each piping including the first connecting pipe 61 (piping size), and a margin.

If it is determined in the increasing-rate determination processing S2 that the predicted increasing rate does not exceed the critical increasing rate of supply (in the case of NO), the pressure controller 83 executes first control processing S4. If it is determined in the increasing-rate determination processing S2 that the predicted increasing rate exceeds the critical increasing rate of supply (YES), the pressure controller 83 executes second control processing S5. The first control processing S4 and the second control processing S5 will be described with reference to FIGS. 4 and 5.

Figure 4:
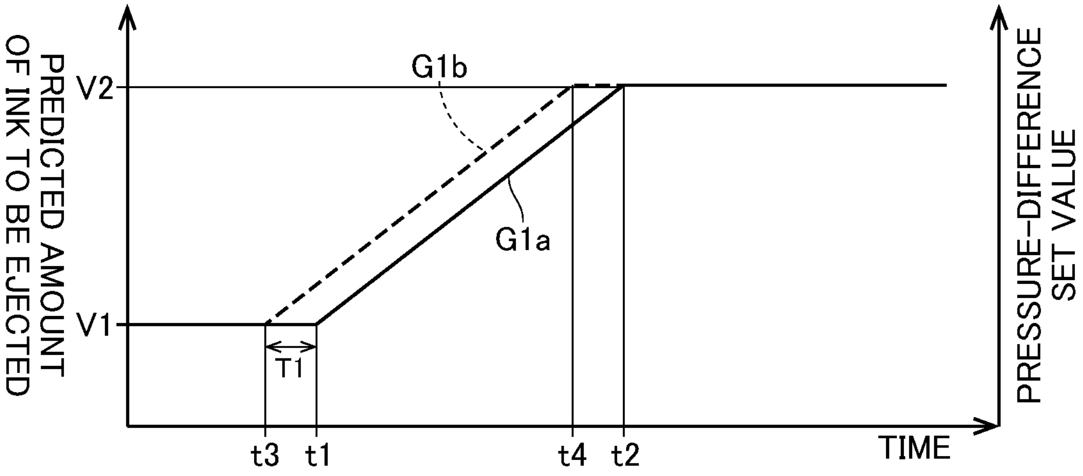
FIG. 4 is a diagram illustrating a change in pressure-difference set value based on an increase in the predicted amount of ink to be ejected.
Figure 5:
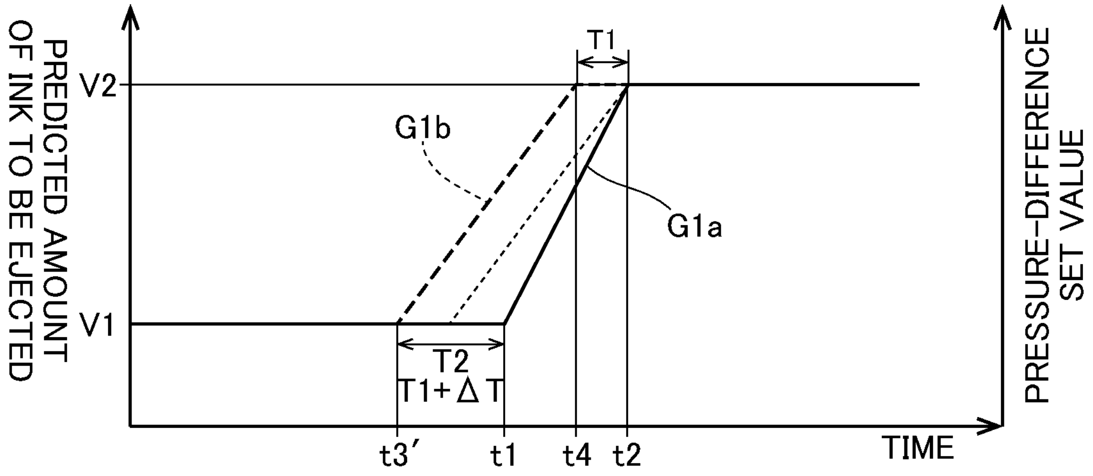
FIG. 5 is a diagram illustrating a change in pressure-difference set value based on an increase in the predicted amount of ink to be ejected.

FIGS. 4 and 5 are diagrams each illustrating a change in pressure-difference set value that depends on the increase in the predicted amount of ink to be ejected. In FIGS. 4 and 5, the horizontal axis indicates time, and the vertical axes indicate the predicted amount of ink to be ejected and the pressure-difference set value. In FIGS. 4 and 5, a graph G1*a* indicated by the solid line shows the predicted amount of ink to be ejected, and a graph G1*b* indicated by the broken line shows a change in pressure-difference set value. The pressure-difference set value refers to a set value of the pressure difference indicated by a control signal output from the pressure controller 83 to the pressure-difference producer 5. Upon the application of the pressure-difference set value to the pressure-difference producer 5, the pressure-difference producer 5 operates such that the pressure difference becomes the applied pressure-difference set value. In the examples illustrated in FIGS. 4 and 5, it is assumed that the predicted amount of ink to be ejected starts to increase from V1 at time t1 and becomes V2 at time t2. FIG. 4 corresponds to the first control processing S4, and FIG. 5 corresponds to the second control processing S5.

As illustrated in FIG. 4, in the first control processing S4, the pressure controller 83 controls the pressure-difference producer 5 on the basis of the predicted amount of ink to be ejected and the first time lag T1. In the first control processing S4, the pressure controller 83 also controls the pressure-difference producer 5 such that the increasing rate of supply becomes a value corresponding to the predicted increasing rate. The predicted increasing rate during a period from time t1 to time t2 is expressed by an inclination m of the predicted amount of ink to be ejected ($=(V2-V1)/(t2-t1)$). If this predicted increasing rate m is lower than a critical increasing rate of supply M($m<M$), the pressure controller 83 starts to change the pressure-difference set value from time t3 that is the first time lag T1 earlier than time t1 as illustrated in FIG. 4. The pressure controller 83 also causes the increasing rate (inclination) of the pressure-difference set value to match the predicted increasing rate m. Thus, the pressure-difference set value that corresponds to the amount of ink to be ejected V2 at time t4, i.e., at the time that is the first time lag T1 earlier than time t2, is applied to the pressure-difference producer 5 at time t2. Accordingly, the pressure difference becomes the magnitude corresponding to the predicted amount of ink to be ejected V2 at time t2 that is delayed by the first time lag T1 from time t4. That is, it is possible to change the amount of ink to be supplied to the predicted amount of ink to be ejected V2 in time for time t2 when the pressure difference becomes the magnitude corresponding to the predicted amount of ink to be ejected V2.

On the other hand, if the predicted increasing rate m is higher than the critical increasing rate of supply M, the pressure controller 83 performs the second control processing S5 illustrated in FIG. 5. In the second control processing S5, the pressure controller 83 starts to change the pressure-difference set value from time t3' that is the second time lag T2 earlier than time t1. The second time lag T2 is longer than the first time lag T1 by an adjustment time ΔT. The pressure controller 83 also causes the increasing rate of the pressure-difference set value to match the critical increasing rate of supply M. Thus, the pressure controller 83 applies the pressure-difference set value corresponding to the amount of ink to be ejected V2 to the pressure-difference producer 5 at time t4 that is the first time lag T1 earlier than time t2. Accordingly, the pressure difference becomes the magnitude corresponding to the predicted amount of ink to be ejected V2 at time t2 that is delayed by the first time lag T1 from time t4. That is, the amount of supply is changed to the predicted amount of ink to be ejected V2 in time for time t2 when the pressure difference becomes the magnitude corresponding to the predicted amount of ink to be ejected V2. Note that the adjustment time ΔT is obtained from the following equation.

$$\Delta T=(t4-t3)-(t2-t1)=(V2-V1)/M-(t2-t1)$$

If the predicted increasing rate m is higher than the critical increasing rate of supply M, even if control is started at a time that is the first time lag T1 earlier than time t1, it is impossible to cause the amount of supply to become the predicted amount of ink to be ejected V2 before time t2. Thus, control is started at a time that is the second time lag T2 earlier than time t1, the second time lag T2 being obtained by adding an adjustment time ΔT to the first time lag T1. This allows the amount of supply to be increased to the predicted amount of ink to be ejected V2 before time t2.

Referring back to FIG. 3, a description is now given of the case where the decrement determination processing S3 is performed. If it is determined in the decrement determination processing S3 that the predicted amount of ink to be ejected decreases (in the case of YES), the pressure controller 83 performs third control processing S6.

The third control processing S6 is processing in which the pressure controller 83 controls the pressure-difference producer 5 on the basis of the predicted amount of ink to be ejected and the first time lag T1. More specifically, in the third control processing S6, the pressure controller 83 controls the pressure-difference producer 5 on the basis of the timing when the predicted amount of ink to be ejected starts to decrease and a decreasing rate of the predicted amount of ink to be ejected (predicted decreasing rate). More specifically, as in the first control processing S4 described with reference to FIG. 4, the pressure controller 83 starts to change the pressure-difference set value at a time that is the first time lag T1 earlier than the time when the predicted amount of ink to be ejected starts to decrease. If the predicted decreasing rate does not exceed the critical decreasing rate of supply, the pressure controller 83 controls the pressure-difference producer 5 such that the decreasing rate of supply matches the predicted decreasing rate. The decreasing rate of supply as used herein refers to the decrement per unit time when the pressure-difference producer 5 reduces the amount of ink to be supplied. The critical decreasing rate of supply refers to a maximum value of the decreasing rate of supply. If the predicted decreasing rate exceeds the critical decreasing rate of supply, the pressure controller 83 controls the pressure-difference producer 5 such that the decreasing rate of supply becomes the critical decreasing rate of supply.

Note that if the predicted decreasing rate exceeds the critical decreasing rate of supply, the pressure controller 83 may control the pressure-difference producer 5 on the basis of a time lag that is longer than the first time lag T1. For example, as in the second control processing S5 described with reference to FIG. 5, the pressure controller 83 may start to change the pressure-difference set value from the time that is a predetermined time earlier than the time when the predicted amount of ink to be ejected starts to decrease, the predetermined time being obtained by adding the adjustment time ΔT to the first time lag T1.

Referring back to FIG. 3, if it is determined in the decrement determination processing S3 that the predicted amount of ink to be ejected does not decrease (in the case of NO) or if one of the first control processing S4, the second control processing S5, and the third control processing S6 is completed, the pressure controller 83 determines whether to end the print processing (completion determination processing S7). For example, in the case where the inkjet printing apparatus 1 has completed all print jobs, the pressure controller 83 determines to end the print processing in the completion determination processing S7. In this case, the pressure controller 83 ends the procedure of control illustrated in FIG. 3. In the case where the inkjet printing apparatus 1 continues printing, the pressure controller 83 determines to continue the print processing in the completion determination processing S7. In this case, the pressure controller 83 executes the increment determination processing S1 again.

Figure 6:
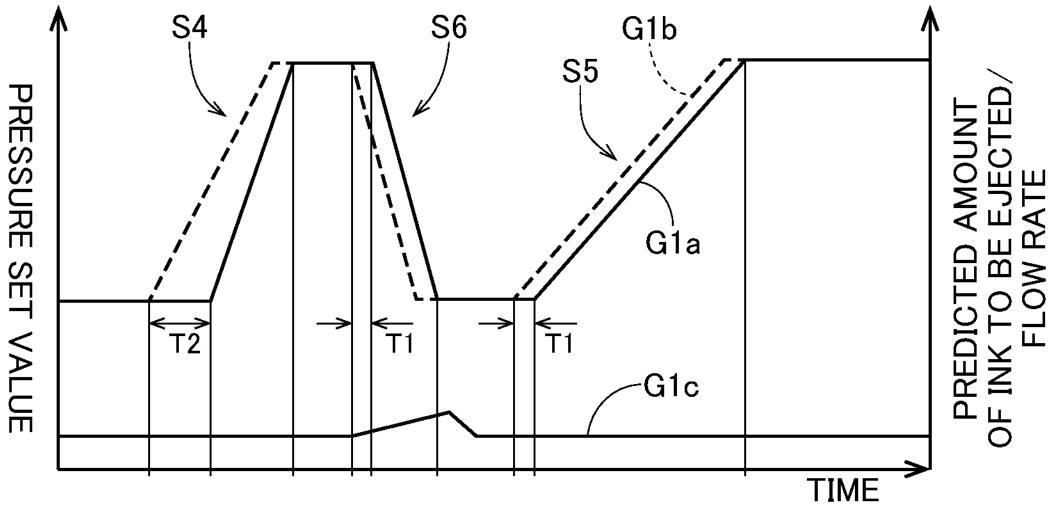
FIG. 6 is a diagram illustrating a change in flow rate on the outlet side of a head.

FIG. 6 is a diagram showing a change in flow rate on the outlet side of a head 31. In FIG. 6, a graph G1*c* shows the flow rate on the outlet side of the head 31. The flow rate on the outlet side of the head 31 may, for example, be the flow rate in the piping between the head 31 and the return tank 43 in the first connecting pipe 61.

In the case where the predicted amount of ink to be ejected increases, the pressure controller 83 performs either the first control processing S4 (see FIG. 4) or the second control processing S5 (see FIG. 5) as described above. This control allows the amount of ink to be supplied to increase without causing a delay in time when the amount of ink to be ejected from the head 31 increases. Accordingly, it is possible to suppress a decrease in flow rate on the outlet side of the head 31 and to avoid the intrusion of air into the head 31. Besides, the progress of ink degradation is suppressed because the amount of ink to be circulated decreases. It is also possible to avoid a situation in which the meniscus in the nozzles becomes unstable. Moreover, it is possible to suppress shortening of life of components such as the pressure pump 522, the pressure reducing pump 523, and the return pump 621.

In the case where the predicted amount of ink to be ejected decreases as illustrated in FIG. 6, the pressure controller 83 starts to change the pressure-difference set value from a time that is the first time lag T1 earlier than the time when the predicted amount of ink to be ejected starts to decrease. In the example illustrated in FIG. 6, the predicted decreasing rate is higher than the critical decreasing rate of supply. Thus, the amount of ink to be supplied temporarily exceeds the amount of ink to be ejected, and accordingly the flow rate on the outlet side of the head 31 increases temporarily. This, however, almost does not affect the ink to be ejected from the head 31 because a sufficient amount of ink is supplied to the head 31.

While the invention has been shown and described in detail, the foregoing description is in all aspects illustrative and not restrictive. It is therefore understood that numerous modifications and variations that are not described above can be devised without departing from the scope of the invention. The configurations in the embodiment and variations described above may be appropriately combined or omitted as long as there are no mutual inconsistencies.

REFERENCE SIGNS LIST

1 inkjet printing apparatus
2 transporter
3 printer
4 ink supplier
5 pressure-difference producer
8 controller
9 base material
31 head
41 supply tank
43 return tank
61 first connecting pipe
62 second connecting pipe
81 ejection-amount predictor
83 pressure controller

The invention claimed is:

1. An ink circulation system comprising:

a supply tank;

a return tank;

a first connecting pipe that connects the supply tank and the return tank and that transfers ink stored in the supply tank to the return tank;

a second connecting pipe that connects the return tank and the supply tank and that returns ink stored in the return tank to the supply tank;

a head that is interposed in the first connecting pipe and capable of ejecting ink;

a pressure-difference producer that produces a pressure difference between the supply tank and the return tank to send ink from the supply tank to the return tank through the first connecting pipe;

an ejection-amount predictor that predicts an amount of ink to be ejected at a time to come after a present time from the head; and a pressure controller that controls an amount of ink to be supplied from the supply tank to the head by controlling the pressure-difference producer in accordance with a predicted amount of ink to be ejected, predicted by the ejection-amount predictor, wherein the pressure controller is configured to execute:

determination processing for determining whether a predicted increasing rate exceeds a critical increasing rate of supply, the predicted increasing rate being an increment in the predicted amount of ink to be ejected per unit time;

first control processing for, when it is determined in the determination processing that the predicted increasing rate does not exceed the critical increasing rate of supply, controlling the pressure-difference producer in accordance with the predicted amount of ink to be ejected and a first time lag that depends on the pressure-difference producer and the first connecting pipe; and second control processing for, when it is determined in the determination processing that the predicted increasing rate exceeds the critical increasing rate of supply, controlling the pressure-difference producer in accordance with the predicted amount of ink to be ejected, timing when the amount of ink to be ejected becomes the predicted amount of ink to be ejected, and a second time lag that is longer than the first time lag.

2. The ink circulation system according to claim 1, wherein the ejection-amount predictor predicts the amount of ink to be ejected, in accordance with image data that indicates an image to be formed on a base material by the head.

3. The ink circulation system according to claim 2, wherein the pressure controller calculates a printing ratio from the image data and controls the pressure-difference producer in accordance with the printing ratio calculated.

4. The ink circulation system according to claim 1, wherein the pressure controller controls the pressure-difference producer in accordance with the predicted amount of ink to be ejected, timing when the amount of ink to be ejected becomes the predicted amount of ink to be ejected, and a time lag that depends on the pressure-difference producer and the first connecting pipe.

5. The ink circulation system according to claim 1, wherein the first control processing includes processing for controlling the pressure-difference producer such that an increasing rate of supply becomes a value that depends on the predicted increasing rate, the increasing rate of supply being an increment in the amount of supply per unit time.

6. The ink circulation system according to claim 1, wherein the second control processing includes processing for controlling the pressure-difference producer such that an increasing rate of supply becomes a value that depends on the critical increasing rate of supply, the increasing rate of supply being an increment in the amount of supply per unit time.

7. The ink circulation system according to claim 1, wherein the pressure-difference producer produces the pressure difference in a condition in which the supply tank and the return tank are both kept under a negative pressure.

8. The ink circulation system according to claim 1, wherein the pressure-difference producer produces the pressure difference in a condition in which the supply tank is kept under a positive pressure and the return tank is kept under a negative pressure.

9. An inkjet printing apparatus comprising:

a transporter that transports a base material in a transport direction; and the ink circulation system according to claim 1.

10. An ink circulation system comprising:

a supply tank that stores ink and in which air pressure inside the supply tank is kept under a positive pressure or a negative pressure;

a return tank that stores ink and in which air pressure inside the return tank is kept under a negative pressure;

a first connecting pipe that connects the supply tank and the return tank and that transfers ink stored in the supply tank to the return tank;

a second connecting pipe that connects the return tank and the supply tank and that returns ink stored in the return tank to the supply tank;

a head that is interposed in the first connecting pipe and capable of ejecting ink, the head having a nozzle and an inkjet element that causes the nozzle to eject ink;

a pressure-difference producer having a first pressure tank that communicates with the supply tank and a second pressure tank that communicates with the return tank, the pressure-different producer being configured to send ink from the supply tank to the return tank through the first connecting pipe by changing pressures in the first pressure tank and the second pressure tank, respectively, to produce an air pressure difference between the supply tank and the return tank;

an ejection-amount predictor that predicts an amount of ink to be ejected at a time to come after a present time from the head; and a pressure controller that controls an amount of ink to be supplied from the supply tank to the head by executing feedforward control that adjusts the air pressure difference by controlling the pressure-difference producer, wherein the feedforward control adjusts the air pressure difference at timing that depend on fluctuation in a predicted amount of ink to be ejected, predicted by the ejection-amount predictor.

* * * * *